(12) United States Patent
Lu et al.

(10) Patent No.: US 6,561,944 B2
(45) Date of Patent: May 13, 2003

(54) SUN GEAR SHELL ASSEMBLY

(75) Inventors: Chao Lu, Pembroke Pines, FL (US); Chester F. Rutkowski, Miami, FL (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/840,908

(22) Filed: Apr. 25, 2001

(65) Prior Publication Data

US 2002/0160876 A1 Oct. 31, 2002

(51) Int. Cl.[7] ................................................ F16H 57/08
(52) U.S. Cl. ......................................................... 475/331
(58) Field of Search .............................. 475/146, 331, 475/901; 192/70.19, 70.16

(56) References Cited

U.S. PATENT DOCUMENTS

| | | | | |
|---|---|---|---|---|
| 3,599,512 A | * | 8/1971 | Wayman | 475/146 |
| 4,418,585 A | * | 12/1983 | Pierce | 475/66 |
| 4,426,891 A | * | 1/1984 | Kubo et al. | 475/146 |
| 4,934,216 A | * | 6/1990 | Sandel et al. | 475/59 |
| 5,232,411 A | * | 8/1993 | Hayashi et al. | 475/146 |
| 5,860,885 A | * | 1/1999 | Mizuta | 475/116 |

* cited by examiner

*Primary Examiner*—Sherry Estremsky
(74) *Attorney, Agent, or Firm*—Baker & Hostetler LLP

(57) ABSTRACT

A sun gear shell assembly includes a cylindrical shell body formed by cold-rolling a low carbon steel, and a neck section having a protruding neck collar, formed by heat drawing and machining a middle carbon steel. A wall thickness of the shell body is increased for added strength. The neck has a 30 degree chamfer to prevent failures at the neck section, and the neck section is then welded to the shell body so that the sun gear shell becomes one piece. A plurality of holes are disposed in the neck section encircling the neck collar. An injection molded plastic washer including a plurality of tabs disposed on one side surface, has the tabs inserted into holes formed in the neck section to form the completed sun gear shell assembly.

25 Claims, 7 Drawing Sheets

FIG. 5A
FIG. 5B
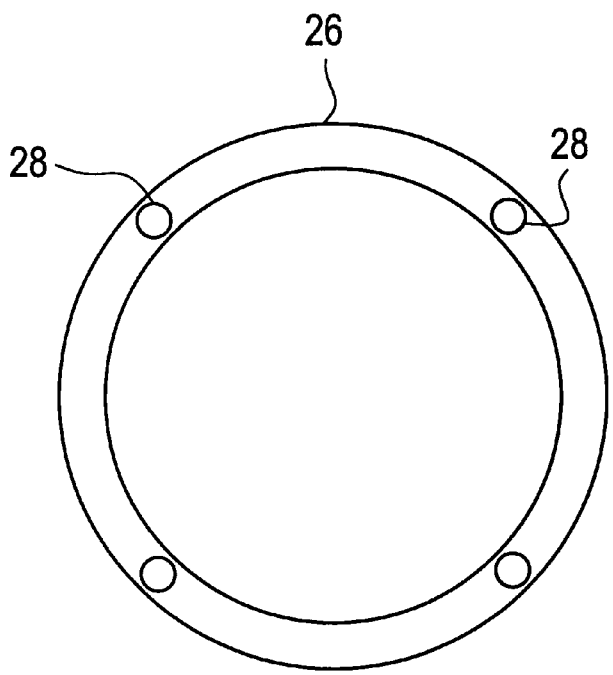
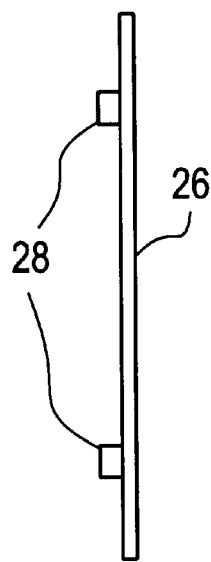

SUN GEAR SHELL ASSEMBLY

FIELD OF THE INVENTION

The present invention relates to the field of transmissions, and more specifically, to sun gear shell assemblies used in automatic transmissions of vehicles.

BACKGROUND OF THE INVENTION

In vehicle automatic transmissions of types TH700, 4L60, 4L60E, conventional original equipment manufacturing (OEM) designs of sun shells 10 use cold-rolled, low carbon steel of the type SAE 1010-1020 for the shell body 11, with the shell body 11 being stamped as one piece (see FIG. 1). However, the sun gear shell 10 used in these transmissions has a history of a high failure rate.

The majority of the failures of the OEM design includes failure at the neck collar 12 of the spline 13 (see FIG. 2) because high stress is concentrated at this point. Specifically, in conventional designs, the neck 12, which is supported on a circular, raised area 14 on an end surface 15 of the shell body 11, is formed unitarily with the shell body 11, with a 90 degree angle formed between the neck 12 and the raised area 14 of the shell body 11. High stress concentration and a weak neck base 12 result in a fatigue problem.

Further, the neck collar design, with the neck 12 being relatively thin and having an outside diameter of $D_1$=60.00 mm, and with the use of thin, weak, materials such as low carbon steel at a thickness of $d_1$=3.00 mm for the sun gear shell body 11, limit the strength of the neck collar 12 and the body 11 of the shell 10.

Still further, the engaging lugs 31 of the shell 10, mushroom due to the use of the thin material for the shell 10, and due to strong operational impact, causing failure of the sun gear shell 10.

SUMMARY OF THE INVENTION

Accordingly, an object of the present invention is to provide a sun gear shell and sun gear shell assembly which is sturdier than previous conventional designs, and which virtually eliminates the high incidence of failures, particularly at the neck.

Specifically, the sun gear shell includes a cylindrical shell body formed by cold-rolling a low carbon steel, and a neck section having a protruding neck collar, formed by heat drawing and machining a middle carbon steel. The middle carbon steel of the neck section is stronger than the low carbon steel of the shell body. The wall thickness of the shell body is increased for added strength. The neck base has a 30 degree chamfer to prevent failures at the neck section, and the neck section is then welded to the shell body so that the sun gear shell becomes a single piece. A plurality of holes are disposed in the neck section encircling the neck collar.

In another aspect of the invention, the sun gear shell assembly includes the sun gear shell as described above, and an injection molded plastic washer having a plurality of tabs on one side surface. The plastic washer has the tabs inserted into holes formed in the neck section of the sun gear shell to form the complete sun gear shell assembly.

The method of manufacturing the sun gear shell, includes deep cold drawing the low carbon steel to form a wall of a cylindrical shell body; forming a neck section having a protruding neck with an enforced corner chamfer, using the middle carbon steel; punching out a plurality of holes encircling the neck; and welding the neck section onto the shell wall to make the sun gear shell become a one-piece construction.

In another aspect of the present invention, the method of manufacturing the sun gear shell assembly includes manufacturing the sun gear shell, and also injection molding a plastic washer having a plurality of tabs on one side surface. To complete the manufacture of the complete sun gear shell assembly, the tabs of the plastic washer are inserted into the holes formed in the neck section.

These modifications to the conventional sun gear shell assembly eliminate the high failure rate at the neck section and provide additional strength to the sun gear shell assembly.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Additional features, details, and advantages of the invention, will become evident from the following description and the drawing, wherein:

FIG. 5A is a bottom perspective view of a washer for a sun gear shell assembly according to a preferred embodiment of the present invention.

FIG. 5B is a side perspective view of a washer for a sun gear shell assembly according to a preferred embodiment of the present invention.

DETAILED DESCRIPTION OF THE PREFERRED EMBODIMENTS

Figure 1:
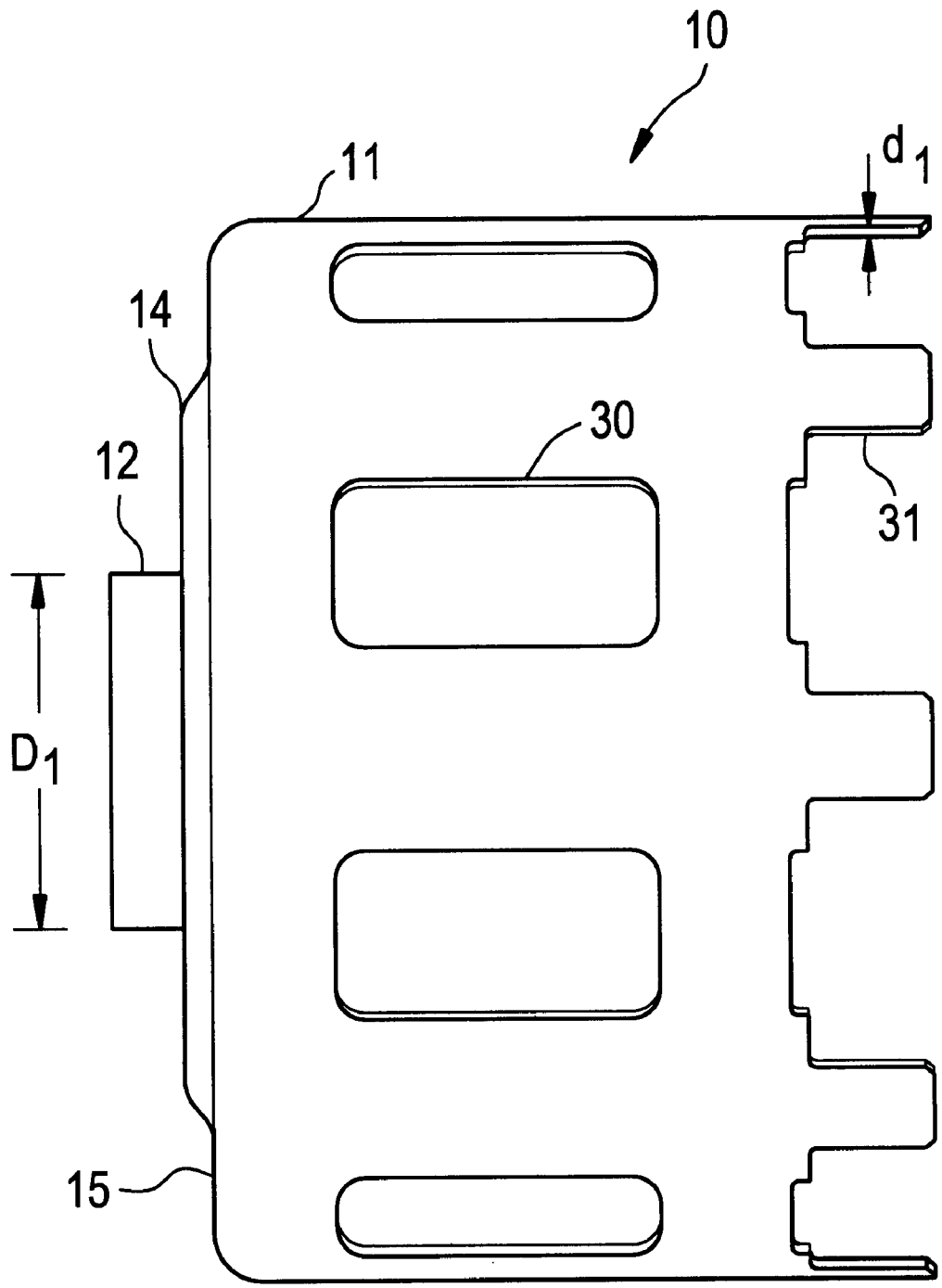
FIG. 1 is a side perspective view of the conventional OEM design of a sun gear shell.
Figure 2:
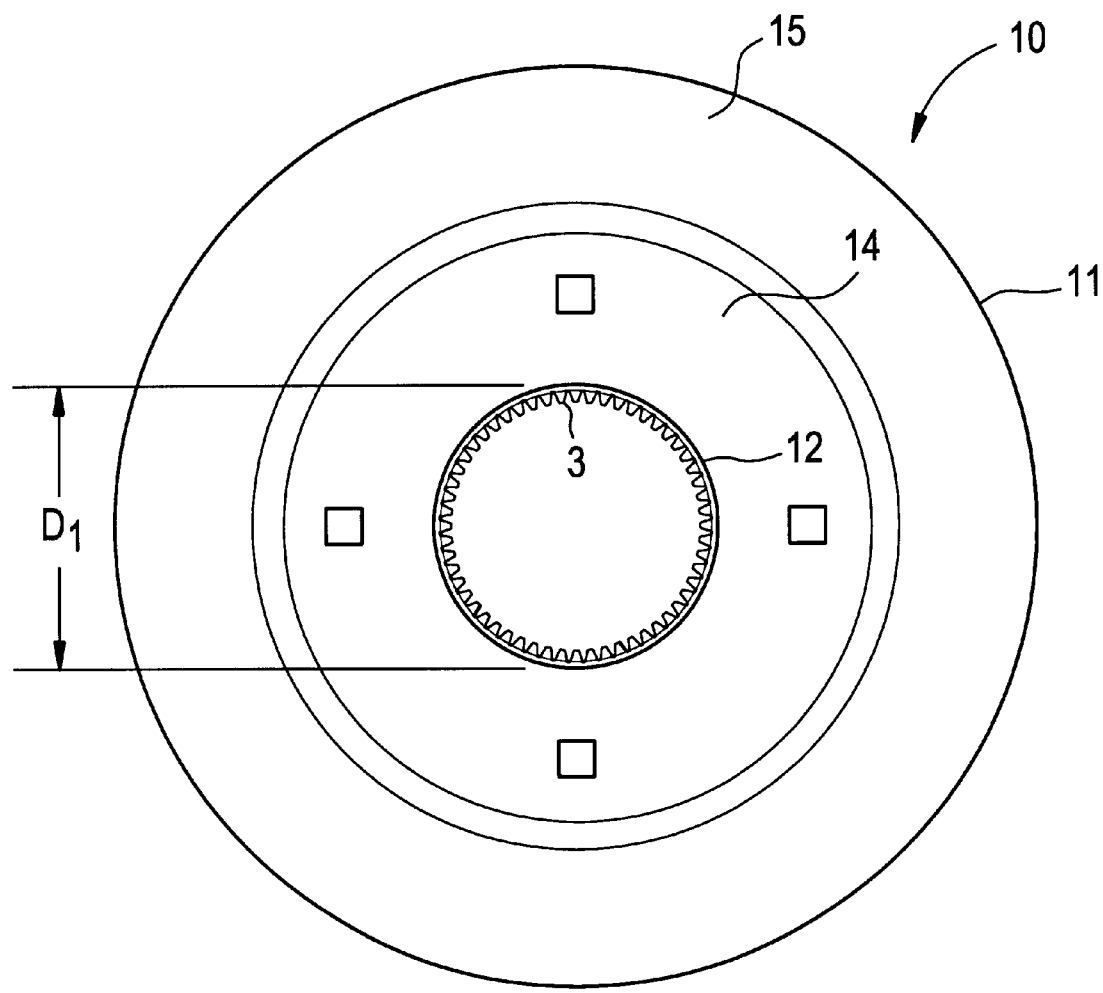
FIG. 2 is an end perspective view of the conventional OEM design of the sun gear shell of FIG. 1.

The present invention, as disclosed in the following description and shown in FIGS. 3–7, includes sun gear shell assembly which corrects for the failures in the conventional OEM sun gear shell assembly by the use of a modified design and stronger materials. It should be noted that like reference numerals denote like structural features throughout the Figures.

Figure 3:
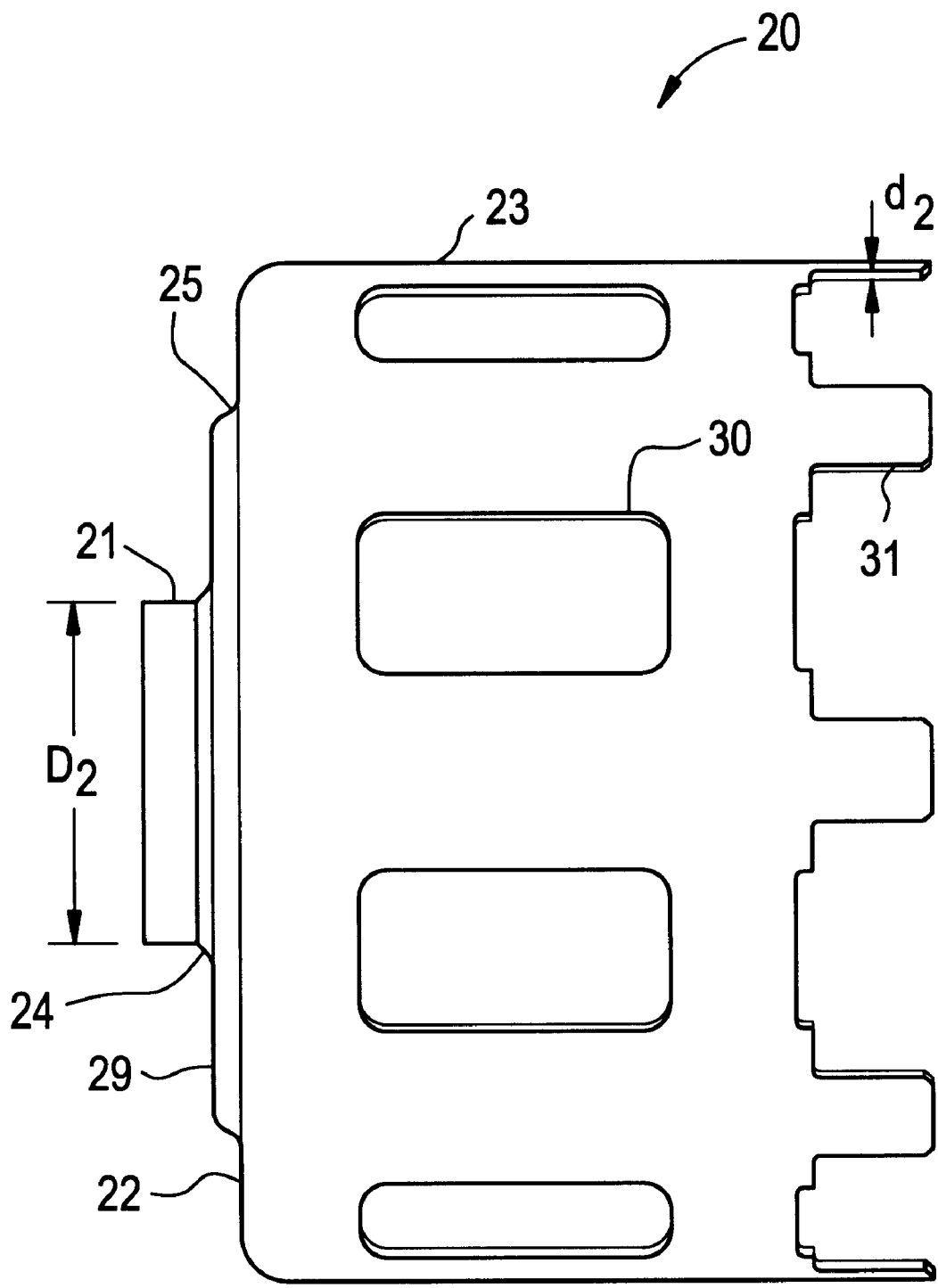
FIG. 3 is a side perspective view of a sun gear shell according to a preferred embodiment of the present invention.
Figure 4:
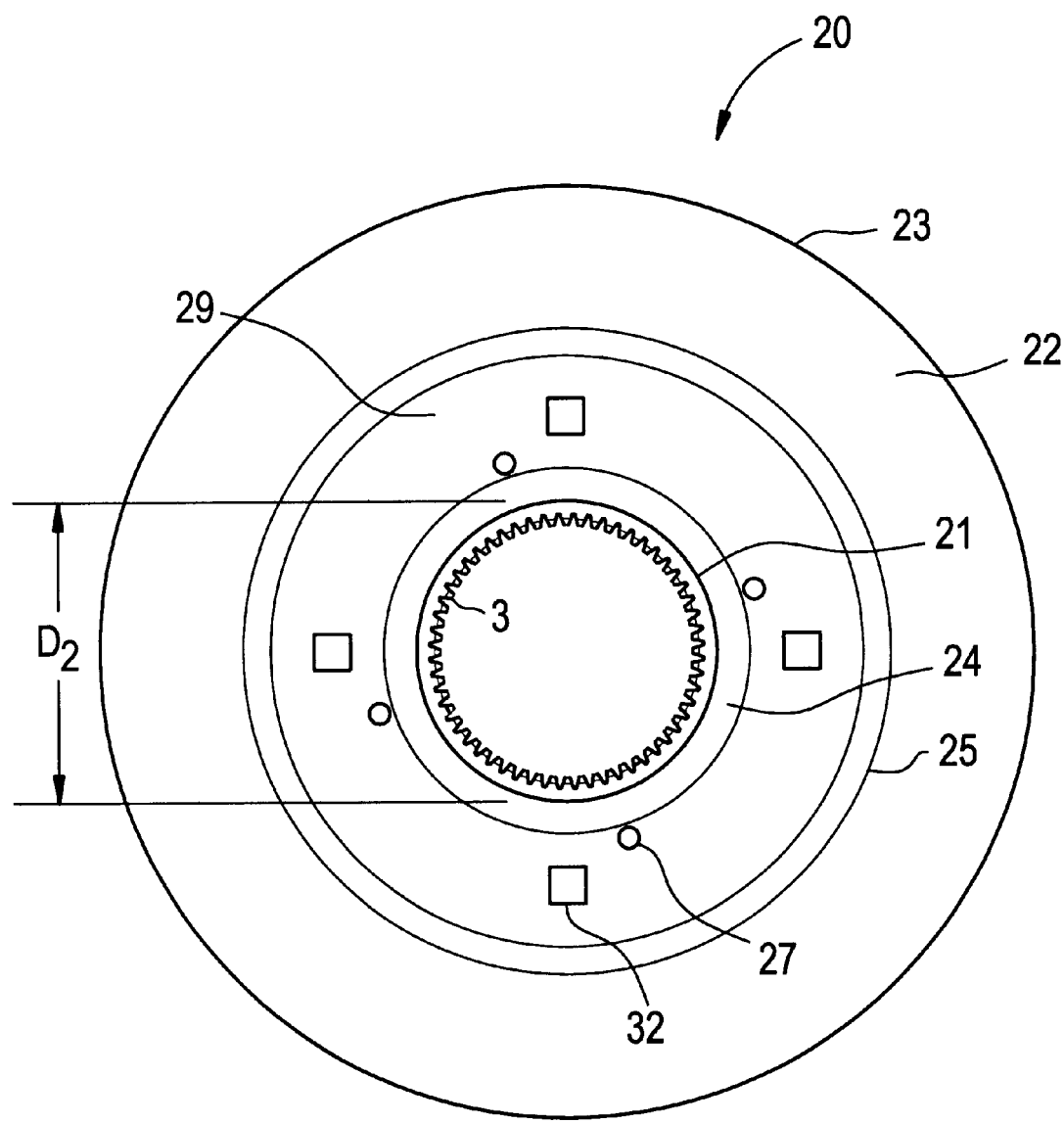
FIG. 4 is an end perspective view of a sun gear shell according to FIG. 3.
Figure 6:
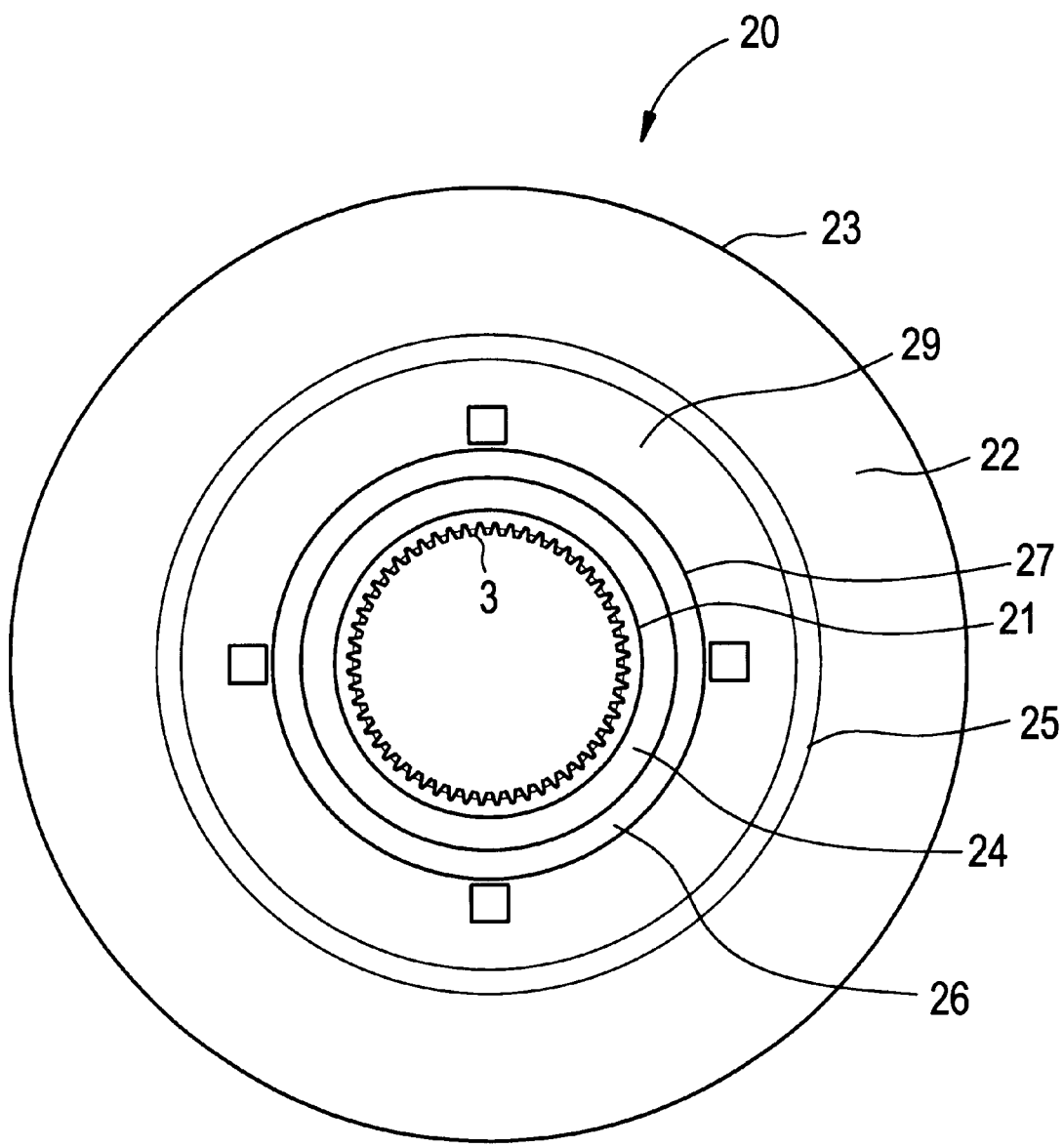
FIG. 6 is an end perspective view of the sun gear shell assembly using the sun gear shell of FIG. 4, with the washer of FIGS. 5A and 5B applied.
Figure 7:
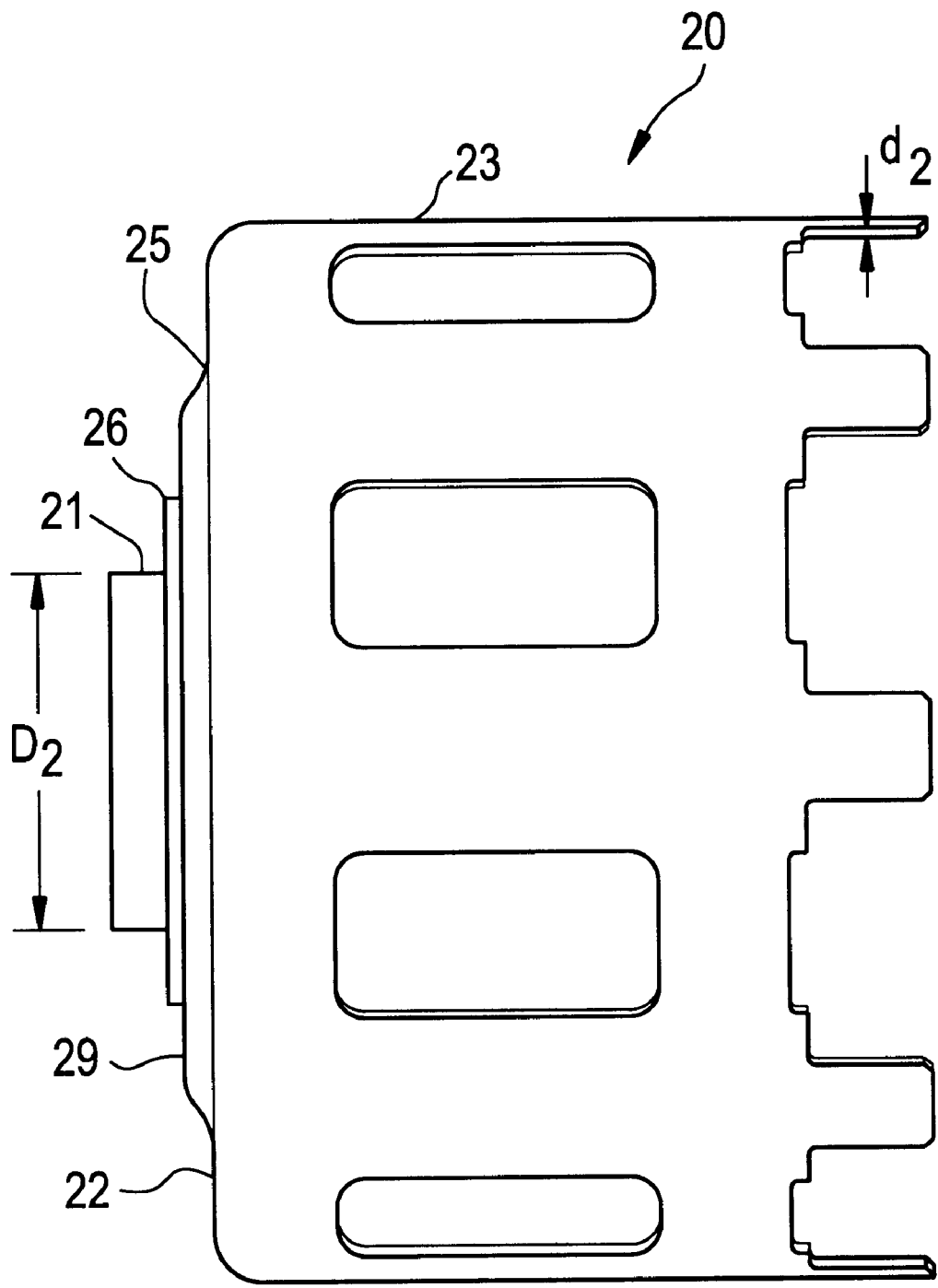
FIG. 7 is a side perspective view of the sun gear shell assembly using the sun gear shell of FIG. 4 with the washer of FIGS. 5A and 5B applied.

The sun gear shell 20 of the present invention, according to a preferred embodiment as shown in FIGS. 3 and 4, utilizes a stronger material than conventional sun gear shells 10. Specifically, a middle carbon steel, of the type SAE 1035-1045, for example, is used for the spline neck section 21. The use of a middle carbon steel, instead of a low carbon steel as used in the conventional OEM design, provides for a stronger neck collar 21. Further, in order to increase the strength of the transition area between the neck 21 and the surface of the shell body 23, a 30 degree chamfer 24 is added to reduce stress concentration.

Although the material used for the neck 21 is middle carbon steel, the material used for the shell body 23 remains the conventional cold-rolled, low carbon steel of type SAE 1010-1020, for example. As shown in FIGS. 1, 3, and 4, there are openings 30, 32 and engaging notches 31 formed in the shell body 23, as in the conventional OEM design.

However, in order to increase the strength of the low carbon steel shell body 23, the thickness of the shell body 23 was increased to $d_2=3.50$ mm minimum rather than the $d_1=3.0$ mm of the conventional shell body 23. The thicker material of the shell body 23 prevents the shell 20 from mushrooming during operational impact.

Additionally, the neck 21 is welded to the shell body 23 along the edge of the circular, raised portion 29 encircling the neck collar 21. The weld line is shown as 25 in FIG. 4. The weld 25 allows the joining of the two separate parts of the neck 21 and the shell body 23 such that the shell 20 appears as one piece.

With the re-design of the neck 12 as noted above, the conventional nylon washer (not shown) which was attached to the clutch inner race, was re-designed and the new plastic washer 26 now attaches to the newly designed shell body 23 (see FIGS. 5A and 5B). The redesigned plastic washer 26 now turns against the inner race instead of the shell body 23. Due to the better surface finish of the race, this change will improve the wearability of the plastic washer 26.

In order for the plastic washer 26 to be attached to the shell body 23, four holes 27 were added to the shell body 23, encircling the neck collar 21, to fit four tabs 28 provided on one side surface of the plastic washer 26 (see FIGS. 5A and 5B). Of course, the number of holes 27 and tabs 28 can be of any number as long as they allow the washer 26 to fit onto the end surface 22 of the shell body 23.

The redesign of the attached washer 26 (see FIGS. 6 and 7 for the washer 26 attached to the shell body 23) has allowed the outside diameter of the neck collar 21 to be increased from $D_1=60.0$ mm to $D_2=62.0$ mm, and also allowed the previously described addition of the 30 degree chamfer 24 at the base of the neck collar 21. The thicker neck 21 greatly increases its strength.

In manufacturing, the neck 21 and the shell body 23 are formed separately, with a cold-rolled flat material of low carbon steel of type SAE 1010-1020, for example, being cut into a blank piece. The blank piece is deep drawn several times on a press machine to form the shape of the shell body 23. Then, the central portion of the shell body 23 at the end surface 22 is punched out for the welding of the spline section 21, and the openings 30, 32 and engaging notches 31 of the shell body 23 are punched out (see FIGS. 3 and 4).

In forming the neck 21 or spline section, a piece of a middle carbon steel of type SAE 1035-1045, for example, is cut, based on predetermined dimensions to fit with the shell body 23. The neck 21 or spline section is heat treated (tempered) to the appropriate predetermined hardness. Then the neck 21 is machined into shape, including chamfering the base of the neck 21 to a 30-degree chamfer, and margins are left for further machining on the outer edges of the spline section.

The neck 21 or spline section is then welded to the shell body 23 on both sides of the joints, leaving a weld line 25. A lathe is used to clean the welding debris on both side of the welding joint 25.

The lathe then cuts the spline neck 21 according to predetermined dimensions and the base surface of the spline neck 21 is made for the spline broaching process. A broach is used to cut the spline 3 based on the outside bottom surface. Burrs are cleaned, if any.

Thus, the finished sun gear shell body 23 appears as one piece.

The plastic washer 27 is injection-molded separately using an appropriate plastic material, burrs are cleaned, and the washer 27 is included with the completed shell body 23 to form a sun gear shell assembly 20.

The replacement of the previous nylon washer, which was attached to the low roller clutch inner race of the transmission assembly, is replaced with the plastic washer 27 which is attached directly to the shell body 23 on its end surface (i.e., underside).

Thus, the sun gear shell assembly 20 replaces the conventional sun gear shell 10 and nylon washer in order to eliminate the high failure rate at the neck section of conventional OEM designs.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A sun gear shell, comprising:
   a cylindrical shell body having an open end and a substantially closed end having an end surface, wherein a wall thickness of said shell body is at least 3.50 mm;
   a neck centrally disposed in, and protruding from, said end surface of said shell body; and
   a plurality of holes disposed in said end surface of said shell body at positions encircling said neck.

2. A sun gear shell, comprising:
   a cylindrical shell body having an open end and a substantially closed end having an end surface;
   a neck centrally disposed in, and protruding from, said end surface of said shell body, wherein a first material is used to form said neck, and a second material is used to form said shell body, and said first material is stronger than said second material; and
   a plurality of holes disposed in said end surface of said shell body at positions encircling said neck.

3. The sun gear shell according to claim 2, wherein said first material includes a middle carbon steel, and said second material includes a low carbon steel.

4. The sun gear shell according to claim 3, wherein said first material is SAE 1035-1045.

5. The sun gear shell according to claim 3, wherein said second material is SAE 1010-1020.

6. A sun gear shell, comprising:
a cylindrical shell body having an open end and a substantially closed end having an end surface;
a neck centrally disposed in, and protruding from, said end surface of said shell body;
a chamfer disposed at an edge portion at a base of said neck located on said end surface of said shell body; and
a plurality of holes disposed in said end surface of said shell body at positions encircling said neck.

7. The sun gear shell according to claim 6, wherein said chamfer is a 30 degree chamfer.

8. A sun gear shell, comprising:
a cylindrical shell body having an open end and a substantially closed end having an end surface;
a neck centrally disposed in, and protruding from, said end surface of said shell body, wherein an outside diameter of said neck is 62.00 mm; and
a plurality of holes disposed in said end surface of said shell body at positions encircling said neck.

9. A sun gear shell, comprising:
a cylindrical shell body having an open end and a substantially closed end having an end surface;
a neck centrally disposed in, and protruding from, said end surface of said shell body, wherein said neck is welded to said shell; and
a plurality of holes disposed in said end surface of said shell body at positions encircling said neck.

10. A sun gear shell assembly, comprising:
a cylindrical shell body having an open end and a substantially closed end having an end surface;
a neck centrally disposed in, and protruding from, said end surface of said shell body, said end surface including a plurality of holes encircling said neck; and
a washer having a plurality of tabs on one side surface, said tabs which fit into said holes.

11. A sun gear shell, comprising:
a cylindrical shell body having an open end and a substantially closed end having an end surface;
a neck centrally disposed in, and protruding from, said end surface of said shell body;
wherein said neck is welded to said shell body.

12. The sun gear shell according to claim 11, wherein a wall thickness of said shell body is at least 3.50 mm.

13. The sun gear shell according to claim 11, wherein a first material is used to form said neck, and a second material is used to form said shell body, and said first material is stronger than said second material.

14. The sun gear shell according to claim 13, wherein said first material includes a middle carbon steel, and said second material includes a low carbon steel.

15. The sun gear shell according to claim 14, wherein said first material is SAE 1035-1045.

16. The sun gear shell according to claim 14, wherein said second material is SAE 1010-1020.

17. The sun gear shell according to claim 11, further comprising a plurality of holes disposed in said end surface of said shell body at positions encircling said neck.

18. The sun gear shell according to claim 11, further comprising a chamfer disposed at an edge portion at a base of said neck located at said end surface of said shell body.

19. The sun gear shell according to claim 18, wherein said chamfer is a 30 degree chamfer.

20. The sun gear shell according to claim 11, wherein an outside diameter of said neck is 62.00 mm.

21. A sun gear shell, comprising:
a cylindrical shell body having an open end and a substantially closed end having an end surface;
a neck centrally disposed in, and protruding from, said end surface of said shell body; and
wherein said neck has a chamfer at an edge portion at a base of said neck located at said end surface of said shell body.

22. The sun gear shell according to claim 21, wherein said chamfer is a 30 degree chamfer.

23. A sun gear shell assembly, comprising:
a cylindrical shell having an open end and a substantially closed end having an end surface;
a neck centrally disposed in, and protruding from, said end surface of said shell body;
a washer disposed on said end surface of said shell body and encircling said neck;
means for attaching said washer to said end surface of said shell body.

24. The sun gear shell assembly according to claim 23, wherein said attaching means comprises a plurality of holes disposed in said end surface at positions encircling said neck.

25. The sun gear shell assembly according to claim 24, wherein said washer has a plurality of tabs disposed on one side surface, said tabs which are disposed in said holes.

* * * * *